United States Patent
Louzoun et al.

(10) Patent No.: US 12,425,340 B2
(45) Date of Patent: *Sep. 23, 2025

(54) SINGLE LOOKUP ENTRY FOR SYMMETRIC FLOWS

(71) Applicant: Intel Corporation, Santa Clara, CA (US)

(72) Inventors: Eliel Louzoun, Jerusalem (IL); Ben-Zion Friedman, Jerusalem (IL); Eli Sorin, Mitzpe Aviv (IL); Nir Haber, Haifa (IL)

(73) Assignee: Intel Corporation, Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/510,251

(22) Filed: Oct. 25, 2021

(65) Prior Publication Data

US 2022/0045950 A1    Feb. 10, 2022

Related U.S. Application Data

(63) Continuation of application No. 15/476,638, filed on Mar. 31, 2017, now Pat. No. 11,159,427.

(51) Int. Cl.
   *H04L 45/745*    (2022.01)
   *H04L 69/22*    (2022.01)

(52) U.S. Cl.
   CPC ............ *H04L 45/745* (2013.01); *H04L 69/22* (2013.01)

(58) Field of Classification Search
   CPC ....... H04L 45/745; H04L 69/22; H04L 45/74; H04L 47/825
   See application file for complete search history.

(56) References Cited

U.S. PATENT DOCUMENTS

| 8,014,282 B2 | 9/2011 | Li et al. |
| 8,661,160 B2 | 2/2014 | Mann |

(Continued)

FOREIGN PATENT DOCUMENTS

| CN | 1774900 A | 8/2009 |
| CN | 101247353 A | 8/2010 |

(Continued)

OTHER PUBLICATIONS

Final Office Action for U.S. Appl. No. 15/476,638, Mailed Dec. 10, 2020, 21 pages.

(Continued)

*Primary Examiner* — Derrick W Ferris
*Assistant Examiner* — M Mostazir Rahman
(74) *Attorney, Agent, or Firm* — Compass IP Law PC

(57) ABSTRACT

Disclosed is a mechanism for maintaining a single lookup table entry for symmetric/bidirectional flows. Multiple recipes are stored for each flow. A recipe is employed to select address information from an incoming packet header based on the packet's direction. The address information and an index are employed to generate a lookup key to find the single lookup table entry with the pertinent switching information. The recipe further indicates action pointers in the lookup table entry that are specific to direction. The action pointers point to an address in an action table that contains instructions for actions that are applied to the packet during switching based on the packet's direction.

15 Claims, 5 Drawing Sheets

(56) References Cited

U.S. PATENT DOCUMENTS

| | | | | |
|---|---|---|---|---|
| 10,205,658 | B1* | 2/2019 | Revah | H04L 45/74 |
| 2013/0272305 | A1* | 10/2013 | Lefebvre | H04L 45/306 |
| | | | | 370/392 |
| 2014/0108534 | A1* | 4/2014 | Good | H04L 65/612 |
| | | | | 709/204 |
| 2015/0172189 | A1* | 6/2015 | Pitchai | H04L 45/7452 |
| | | | | 370/392 |
| 2016/0020968 | A1* | 1/2016 | Aumann | H04L 43/0888 |
| | | | | 370/252 |
| 2016/0315881 | A1 | 10/2016 | Pierson et al. | |

FOREIGN PATENT DOCUMENTS

| | | |
|---|---|---|
| CN | 101247337 A | 11/2012 |
| CN | 103718520 A | 7/2017 |

OTHER PUBLICATIONS

First Office Action for U.S. Appl. No. 15/476,638, Mailed Aug. 25, 2020, 20 pages.

Notice of Allowance for U.S. Appl. No. 15/476,638, Mailed Jun. 24, 2021, 8 pages.

English Translation of First Chinese Office Action of P.R. China State Intellectual Property Office for Patent Application No. 201810167177.9, Mailed Jan. 10, 2024, 15 pages.

First Chinese Office Action of P.R. China State Intellectual Property Office for Patent Application No. 201810167177.9, Mailed Jan. 10, 2024, 11 pages.

Third Chinese Office Action of P.R. China State Intellectual Property Office for Patent Application No. 201810167177.9, Mailed Aug. 19, 2024, 8 pages.

Second Chinese Office Action of P.R. China State Intellectual Property Office for Patent Application No. 201810167177.9, Mailed Jun. 1, 2024, 8 pages.

* cited by examiner

SINGLE LOOKUP ENTRY FOR SYMMETRIC FLOWS

CROSS-REFERENCE TO RELATED APPLICATIONS

This application is a continuation of U.S. patent application Ser. No. 15/476,638, filed Mar. 31, 2017. The entire specifications of which is hereby incorporated herein by reference in its entirety.

BACKGROUND

Modern networks consistently communicate massive amounts of data between various network entities. Traffic may be communicated via flows. A flow is a set of communications between end points that are part of a common communication session. Data describing the flows is stored along network paths between the communicating end points. Flows may contain sub-groups of traffic that are treated differently during the communication process. As each sub-group of traffic is treated differently, data describing each sub-group is stored separately. When an arbitrarily large numbers of flows are communicated, separate storage of data for corresponding sub-groups of the flows may act as a limiting factor when considering how much data can be communicated across any specified network entity in the network.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

Figure 1:
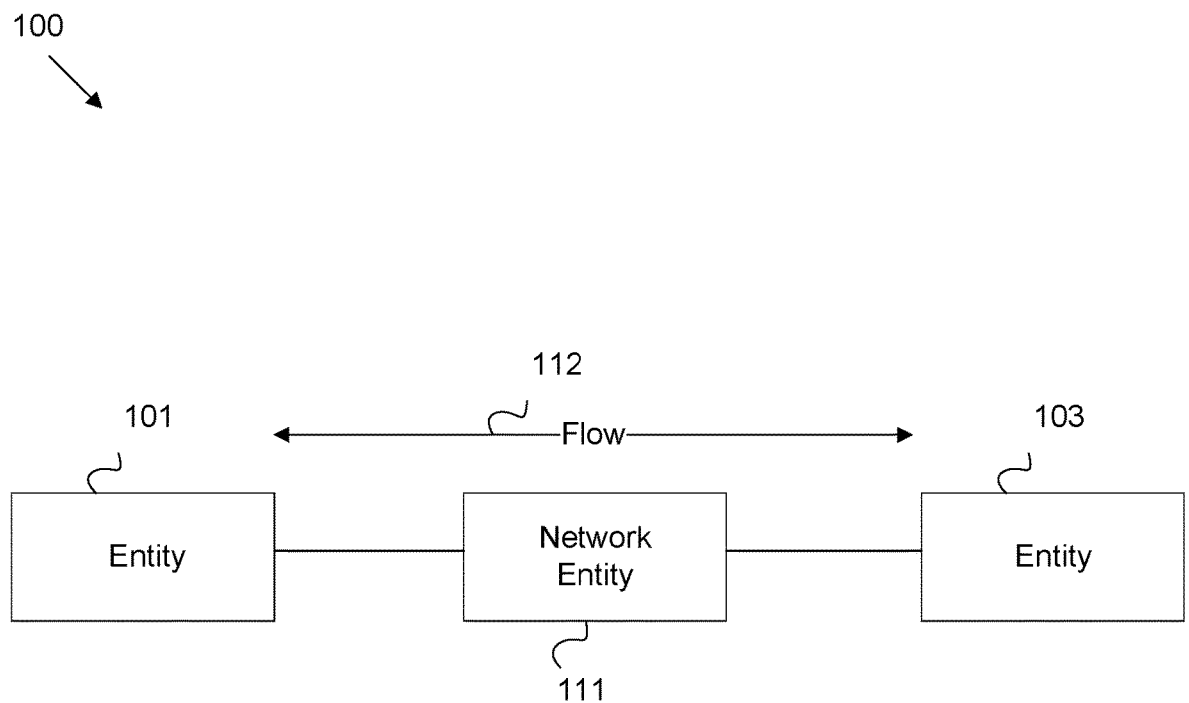
FIG. 1 is a schematic diagram of an example of a network for communicating symmetric/bidirectional flows.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium(s), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Network entities, such as network interface cards, network switches, virtual switches, routers, etc., may store switching information for each flow in a lookup table (LUT). Such switching information may include indications of source ports, source addresses, destination addresses, etc. Each sub-group of a flow may be assigned a different entry in the LUT so that packets belonging to the sub-group can be switched/routed properly. LUT space is limited, and hence multiple entries for a flow decrease the number of flows a network entity can support. In many cases, multiple entries for a common flow contain redundant data. For example, a symmetric flow, such as a bidirectional flow, may include a pair of communications traversing the same network path in opposite directions. Each direction may be assigned a different entry, but the entries contain substantially the same data. The only difference is that a destination port, destination address, and optionally next hop of one directional flow is the source port, source address, and optionally previous hop, respectively, of the opposite directional flow, and vice versa.

Disclosed herein are mechanisms to support employing a single lookup entry in a LUT for a symmetric/bidirectional flow. A set of recipes are stored in a separate recipe memory. The recipes contain information sufficient to re-order data from the LUT as desired to allow for different packet treatment based on a single LUT entry. For example, in a network interface card, recipes may include a transmit (Tx) recipe and a receive (Rx) recipe. A separate action table may also be employed. The action table may contain a plurality of standardized actions to be employed when switching packets. The LUT entry may contain action pointers addressed to entries in the action table. The recipes may contain sufficient information to select the appropriate action (s) for the packets from the action pointers in the LUT. In this example, a profile chooser selects the appropriate recipe for a packet based on the packet header. A field chooser then obtains the selected recipe from memory. The field chooser employs the recipe to determine the location of address information in the packet header. In some embodiments, the field chooser may also employ the recipe to re-order the fields in the packet header for reading. In either embodiment, the field chooser employs an index from the recipe and the address information from the header to generate a lookup key to look up the entry in the LUT. The index is associated with the corresponding flow and employed to find a single match, for example to ensure the correct entry is obtained when different flows employ the same addresses in different addressing protocols, such as a media access control (MAC) address and an internet protocol (IP) address for different flows that share the same value and are stored in the same address column of the LUT. The LUT returns switching information for the packet (e.g. source address, destination address, source ports, action pointers, etc.) The recipe and/or indication of action pointers from the recipe are then employed to select and obtain the actions for the packet. The actions, switching information, and address information may then be forwarded (e.g. via additional processing stages) toward an output processing unit, such as an output queue and/or a direct memory access (DMA) unit. The output processing unit may then execute the actions on the packet based on the address information and switching information, for example by applying a service to the packet (e.g. security), switching/routing the packet upstream/downstream, writing the packet contents to memory for use by a local virtual entity, etc. As examples, the mechanisms employed herein may be implemented in a network interface card in a server, a network switch, a network router, a virtual switch, and/or any other network entity for communicating packets, frames, or other data between network end points.

FIG. 1 is a schematic diagram of an example of a network 100 for communicating symmetric/bidirectional flows. Network 100 may be any network for communicating data, such as an electrical network, an optical network, a cloud network, a software defined network, etc. Network 100 includes an entity 101 and an entity 103. Entities 101 and 103 may be any entities configured to communicate with each other via a flow 112. Depending on the embodiment, entities 101 and 103 may be positioned in geographically remote networks, in a common network, or on the same physical server. The entities 101 and 103 communicate via one or more network entities 111. A network entity may be any entity configured to communicate packets from a flow 112 between entities 101 and 103, for example along a network path. Flow 112 is a set of communications between end points, such as entities 101 and 103, when such communications are part of a common communication session. Flow 112 may be a symmetric flow, such as a bidirectional. A bidirectional flow is a flow that communicates data from entity 101 to entity 103 and vice versa. In other words, flow 112 may move data packets/frames in two opposite directions depending on the desired utilization. For purposes of clarity, all communications (e.g. IP packets, MAC frames, etc.) are hereinafter referred to as packets. For example, a query message may be transmitted from entity 101, acting as a source, to entity 103 acting as a destination. A responsive message may be transmitted from entity 103, acting as a source, to entity 101 acting as a destination. The flow 112 is communicated via network entity 111.

Network entity 111 may be a network interface card, a network switch, a router, a virtual switch (e.g. virtual local area network (VLAN) switch), and/or any other entity capable of communicating a bidirectional flow 112. Network entity 111 may employ a large number of ports coupled to various additional network entities and/or additional entities acting as sources and destinations for other flows. Hence, network entity 111 employs a LUT containing data to determine how to correctly route/switch flow 112 packets. Upon receiving a packet, the network entity queries the LUT to determine how to switch/route the packet. For example, the network entity 111 may employ information from the LUT to determine an output port, a next hop address, network tunnel tag, etc. for an incoming packet included as part of flow 112.

As noted above, one mechanism to support flow 112 employs a separate LUT entry for each type of packet communicated via flow 112. The corresponding LUT entry can be queried to obtain the specific switching/routing information for the corresponding packet. Such a system introduces inefficiency because any change to the entire flow 112 requires that all related entries be updated. Further, multiple LUT entries take up LUT space and hence limit the number of flows that a network entity can manage simultaneously. Instead, network entity 111 employs a recipe table and an action table in addition to the LUT. Recipes are specific to each type of packet in a flow 112. This allows multiple types of packets in a flow 112 to share a single LUT entry. The recipe can also be employed to select specific actions from the LUT entry and obtain the selected actions from the action table so that different actions can be applied to different packets while employing a single LUT entry. Further, changes to the flow 112, such as an address/port change in a network path, can be made by altering a single entry in the LUT.

Figure 2:
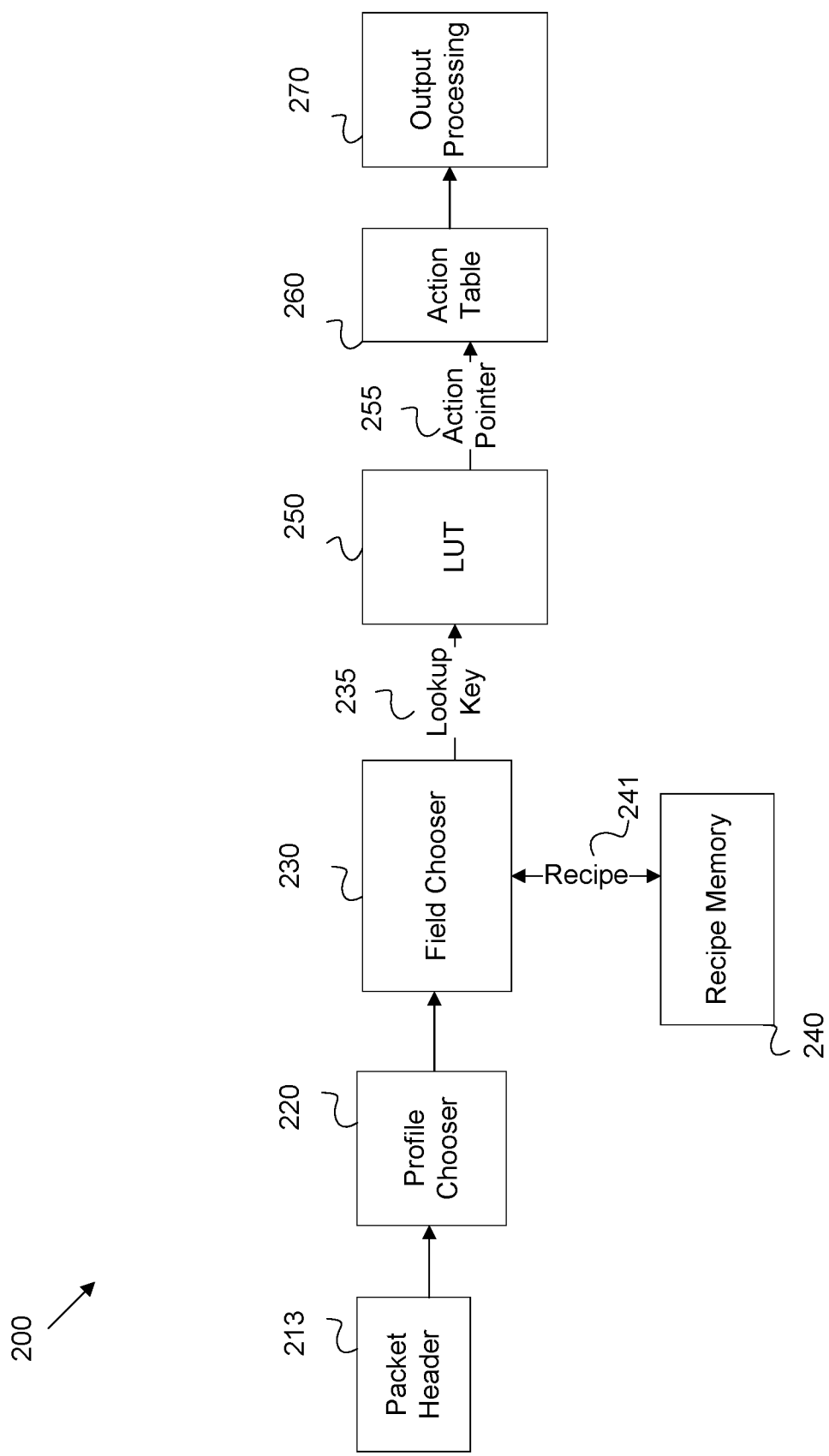
FIG. 2 is a schematic diagram of an example communications pipeline for employing a single lookup table entry for a symmetric flow.

FIG. 2 is a schematic diagram of an example communications pipeline 200 for employing a single LUT entry for a symmetric flow, such as a bidirectional flow 112. Communications pipeline 200 may be implemented in a network entity such as network entity 111. Communications pipeline 200 includes a profile chooser 220, a field chooser 230, a LUT 250, an action table 260, an output processing unit 270, and a recipe memory 240. Communications pipeline 200 receives a packet header 213 and determines how to process the corresponding packet.

A packet header 213 is a non-payload portion of a data packet containing metadata indicating handling instructions for that packet. For example, the packet header 213 may contain a packet source IP address, a packet source MAC address, a packet destination IP address, a packet destination MAC address, error correction data, data indicating a communication protocol associated with the packet, packet hop counts, packet priority, packet length, packet tags (e.g. VLAN tags, VXLAN tags, network tunneling tags), etc. The packet header 213 may contain more data describing the packet than needed by the network entity to determine how to switch the packet. Further, the information may be encoded in the packet in various locations depending on the communication protocol(s) being employed by the sender/receiver.

A profile chooser 220 includes processing circuitry for receiving the packet header 213 from a packet in a flow and selecting a recipe from recipe memory 240 based on information in the packet header. For example, the profile chooser 220 may examine the packet header 213 for metadata indicating a classification of the packet. Such classification may then be employed to select a recipe. As such, the profile chooser 220 selects the recipe based on metadata information in the packet header. For example, when communications pipeline 200 operates in a network interface card, the profile chooser may review the metadata to determine whether the packet was received or is being sent by a server coupled to the pipeline 200. An associated Rx or Tx recipe is then selected based on the classification. It should be noted that additional classifications, and hence additional recipes, may be employed, depending on the embodiment. The profile chooser 220 then forwards the packet header 213 and data indicating the selected recipe to the field chooser 230. The profile chooser 220 may be implemented in a processor, an application specific integrated circuit (ASIC), a field programmable gate array (FPGA), or other processing circuitry.

The recipe memory 240 is a memory system that includes a plurality of entries for storing a plurality of recipes for network switching of flows. For example, the recipe memory 240 may contain recipes that are applicable to various types of packet headers 213. The recipe memory 240 may be searchable and/or addressable by the field chooser for fast retrieval of the recipes. The recipe memory 240 may include non-volatile memory that contains various default recipe types. Such default recipes may be reprogrammed as desired to support various packet types. In an embodiment, the recipe memory 240 includes address offsets and/or bit masks indicating the location of relevant address information in the corresponding packet type. The offsets/bit masks may be employed to select only the desired address information from the packet header. For example, a packet headed in a first direction (e.g. Rx/downstream) contains the same data as a similar packet headed in a second direction (e.g. Tx/upstream). It should be noted that the recipe may select the order in which fields are employed when performing a lookup in LUT 250. For example, a lookup based on a destination address and a source address based on a Tx recipe matches the same flow as a lookup based on a destination address and a source address based on an Rx recipe. As such, the recipes indicate which fields of the header contain the desired information regardless of direction. This allows the specified recipe to effectively swap the order of addresses in the packet header 213 to match the order of addresses in the single LUT entry for the flow. In another embodiment, the recipe memory 240 includes instructions that may be employed by the field chooser 230 to reorganize the packet header, or a copy of the packet header, into standardized format that matches the address order in the LUT 250 regardless of packet type.

The field chooser 230 contains processing circuitry to receive the packet header 213 from the packet in the bidirectional flow via the profile chooser 220. The field chooser 230 also receives the address of the recipe selected by the profile chooser 220. The field chooser 230 obtains the selected recipe 241 from recipe memory 240. The field chooser 230 selects address information from the packet header 213 based on the recipe 241. The address information may include packet source address(es), destination address (es), tags, etc. Based on an index from the recipe 241 corresponding to the flow and the address information, the field chooser 230 generates a lookup key 235. The lookup key 235 includes the recipe index to prevent false positive matches in certain cases. For example, various flows may employ different routing protocols with different addressing schemes. In the event the LUT 250 contains addresses generated under multiple addressing schemes with overlapping address spaces, such addresses may contain the same numerical value in the LUT 250 even though the value may have a different meaning. The recipe 241 index inclusion in the lookup index 235 ensures the correct LUT 250 entry for the flow is found. The field chooser 230 may be implemented in a processor, an ASIC, an FPGA, or other processing circuitry.

The LUT 250 is a configurable memory table including a plurality of entries containing at least one entry for each flow managed by the network entity. The LUT 250 may contain rows for storing the entries and columns for storing various switching information for the entries. The LUT 250 may contain a single entry for bidirectional flows. The LUT 250 entry may include an index that may correspond to the flow contained in the entry. The LUT 250 also stores switching information for the bidirectional flows in the entries. The switching information may include indications of source ports, source addresses, destination addresses, action pointers to actions in the action table 260, and/or any other data, as desired, to communicate a packet/frame of a flow along a network path toward an end point destination address (e.g. as included in address information of a packet). The LUT 250 receives the lookup key 235 from the field chooser and finds the entry associated with the flow by employing the recipe index, information generated from the address information, or combinations thereof. The LUT 250 then returns the switching information based on the lookup key. The LUT 250 may be implemented in many different ways in accordance with this disclosure. For example, the LUT 250 may store switching information in a hash table and employ a hash value from the lookup key 235 to obtain the proper flow entry, and hence act as a HASH memory LUT. As another example, the LUT 250 may also be implemented according to a content addressable memory (CAM) scheme, such as ternary CAM (TCAM), and a correspondingly formatted lookup key 235, and hence act as a TCAM LUT. LUT 250 may also be implemented in any other content searching technology. The LUT 250 then forwards the switching information towards the output processing unit 270, for example via the action table 260. The LUT 250 may be implemented in any non-volatile (or volatile) memory.

The LUT 250 entry may contain one or more action pointers 255 for the flow. The recipe 241 may contain information to select the appropriate action pointer(s) 255 based on packet direction. The selected action pointer 255 is forwarded to the action table 260. The selected action pointer 255 indicates the location of data indicating action(s) to be performed on a packet corresponding to the selected recipe 241. Such actions are stored in the action table 260. In some examples, the selected action pointer 255 may indicate an address location of a single entry in the action table 260. In other examples, the selected action pointer 255 may include a bitmap that indicates several entries, hence several actions, to be performed on a packet corresponding to the recipe 241.

The action table 260 is any volatile (or non-volatile) addressable memory for storing actions. The action table 260 may contain an addressable list of all actions to be taken upon receiving a packet as part of any flow. For example, the action table may contain rows of addressable entries and one or more columns of action(s) per entry. Accordingly, an action pointer 255 selected by a recipe need only reference an address in the action table 260 to communicate the appropriate action. Upon receiving the action pointer 255, the action table 260 returns one or more actions for the packet, associated with the packet header 213, based on the selected recipe 241. The action table 260 may contain a default list of actions that are reconfigurable by an administrator and/or dynamically reconfigurable at run-time by a controller in a cloud network. As an example, the actions for the packet may indicate handling instructions for application to the packet based on a direction of the packet as part of a bidirectional flow. Such actions may be tailored to a particular example of the output processing unit 270. For example, such actions may include forwarding, security actions (e.g. packet drop), memory writing, queueing, network tag modification (e.g. push/pop), destination ports, next hop, tunnel tags, VLAN tags, VXLAN tags, etc.

The output processing unit 270 is any component(s) or system coupled to the communication pipeline 200 for switching/routing flows of packets by executing actions obtained from the action table 260. The implementation of the output processing unit 270 may vary depending on the implementation of the system containing the communications pipeline 200. For example, the communications pipeline 200 may be implemented in a network interface card installed in a server or other computing device. In such case, the output processing unit 270 may include communications queue(s) for communicating data packets with entities hosted on the server. The output processing unit 270 could also be implemented as a direct memory access (DMA) component configured to write data packets directly to server memory. As another example, the communications pipeline 200 may be implemented in a network switch or other routing component. In such a case, the output processing unit 270 may include communications queue(s) and electrical and/or optical ports for communicating with other network switches/servers. In yet another example, the communications pipeline 200 may be implemented in a virtual switch/router operating in a hardware switch or server. In such a case, the output processing unit 270 may include various combinations of communications queues, communication ports, DMA, etc. In any of the above mentioned examples, the output processing unit 270 may include additional processing components, such as processor circuits, software modules, memory, etc., to complete other actions indicated by the action table, for example a firewall provided to maintain security. In some embodiments, all or parts of the communications pipeline may be implemented as circuits and memory on a processor die.

Regardless of the particular implementation, the output processing unit 270 is designed to receive the address information from the packet header 213, the switching information from the LUT 250, data indicating the actions from the action table 260, and/or the recipe 241 from recipe memory 240. The output processing unit 270 may then communicate the packet associated with the packet header 213 accordingly. For example, the output processing unit 270 may employ the information from the single LUT 250 entry to forward a first packet of a bidirectional flow upstream according to a first recipe 241 and employ the same information from the single LUT 250 entry to forward a second packet of a bidirectional flow downstream according to a second recipe 241. As such, the recipes 241 in recipe memory 240 can be modified to cause different behavior in the communications pipeline 200 for different types of packets in the same flow while only employing a single entry for the flow in the LUT 250. This may reduce the size of the LUT 250, and hence decrease device costs, and/or allow a single communications pipeline 200 to manage more flows. Further, a single/reduced number of entries per flow in the LUT 250 speed overall device speed because only one entry is added, updated, and/or deleted in the LUT 250 when the flow changes.

Figure 3:
FIG. 3 is a schematic diagram of example recipes.

FIG. 3 is a schematic diagram 300 of example recipes 310 and 320 that may be stored in a recipe memory such as recipe memory 240. It should be noted that many recipes may be employed based on desired characteristics of subgroups of packets in a flow and based on a particular implementation of a communications pipeline, such as communications pipeline 200. As such, recipes 310 and 320 are exemplary and non-limiting. For example, recipes 310 and 320 may be employed in a communications pipeline in a network interface card. A network interface card may transmit flow packets from the attached server over a network by employing the Tx recipe 320 and receive packets from the network for delivery to entities on the server by employing the Rx recipe 310. As such, Rx recipe 310 and Tx recipe 320 may be direction specific recipes corresponding to the bidirectional flow, and may include descriptions of both directions at a network interface card. In alternate embodiments, similar recipes, for example configured via input and/or output port, may be employed by physical and/or virtual network switches/routers.

Rx recipe 310 includes information for use when switching/routing packets received from the network. Hence, Rx recipe 310 may be selected as a selected recipe (e.g. recipe 241) upon receiving a packet at a network interface card. Rx recipe 310 includes an index field 311, a source address field 312, a destination address field 313, and an action field 314. The index field 311 contains an index value indicating the bidirectional flow. As the index corresponds to the bidirectional flow, the index can be included in the lookup key to prevent false positive matches in the lookup table.

The source address field 312 and destination address field 313 may contain an offset and/or bit mask indicating the location of a source address and a destination address, respectively, in a packet received from the network and destined for a local entity (e.g. an entity operating on a server including the communications pipeline). The source address and a destination address act as address information for use in accessing switching information from the flow entry in the lookup table. Hence the selected recipe includes an offset indicating a starting location of the address information in the packet header based on a direction of the packet. Further, the selected recipe includes a bit mask indicating a bit location of the address information in the packet header based on a direction of the packet. In another example, a field chooser, such as field chooser 230, may select address information by reorganizing the packet header based on the instructions of the selected recipe. In such a case, the data in the source address field 312 and destination address field 313 may indicate the location of the source address and destination address, respectively, in the packet to instruct the field chooser how to reorganize the packet header based on the direction of the packet.

Rx recipe 310 also includes action field 314. The action field 314 includes a location of a selected action pointer, in the LUT entry, that addresses a location of a selected action in an action table, such as action table 260, to indicate that such actions are specific to the direction of the packet. As noted above, a LUT entry may contain multiple action pointers, and the action field indicates which action pointer should be employed for the specified packet. As such, the communications pipeline can employ the action pointer indicated by the action field 314 in Rx recipe 310 to find actions that should be taken when a packet from a bidirectional flow, indicated by index field 311, is received at a network interface card. In some cases, the execution of multiple actions is desired. To allow for such cases, the action pointer indication in the action field 314 may include a bitmap that indicates a plurality of action pointers in the LUT that address locations of a plurality of actions in the action table for application to the packet. For example, multiple actions may be available for a corresponding flow and a bit map may contain information sufficient for a bitwise operation to determine which of the available actions should be taken.

The Tx recipe 320 is substantially similar to the Rx recipe 310, but contains data selected/ordered for use when switching/routing packets for transmission across the network. Hence, Tx recipe 320 may be selected as a selected recipe (e.g. recipe 241) upon receiving a packet from a local entity at a network interface card for network transmission. Tx recipe 320 includes an index field 321, a destination address field 322, a source address field 323, and an action field 324. The data contained in index field 321 may be substantially similar to the data in index field 311 when Tx recipe 320 and Rx recipe 310 pertain to the same flow. As a packet being transmitted is headed in the opposite direction to a packet being received, the destination address field 322 contains the same address as source address field 312 and the source address field 323 contains the same address as destination address field 313. As such, the Tx recipe 310 allows the source and destination address for a flow to be transposed depending on the direction of the packet. Action field 324 contains substantially the same data as action field 314, but provides the location of action pointers to action(s) that are specific to a packet being transmitted instead of received. As such, the Rx recipe 310 and Tx recipe 320 can be used to find desired switching information for a bidirectional flow from a single entry in a LUT and indicate appropriate actions based on packet direction.

Figure 4:
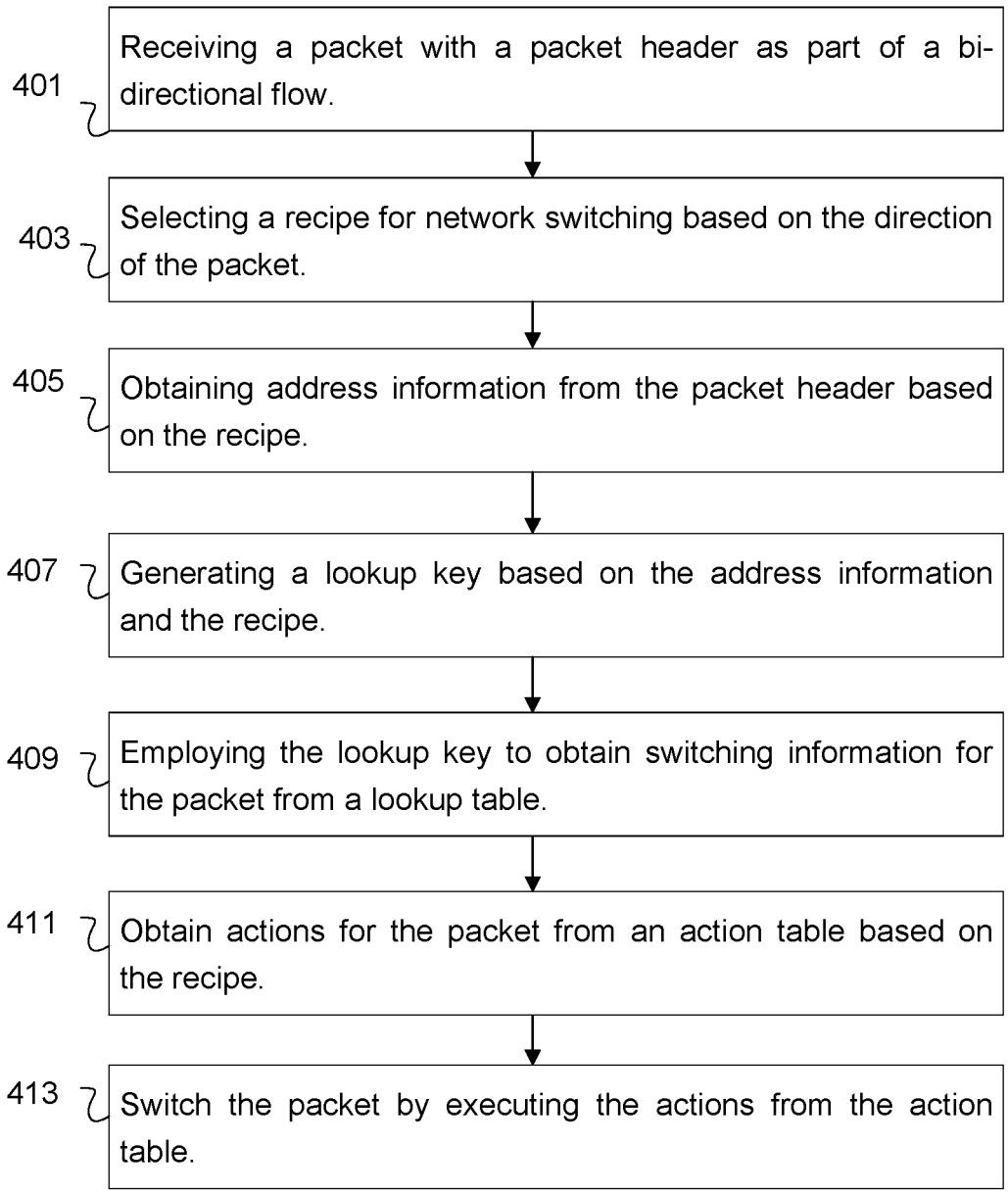
FIG. 4 is a flowchart of an example method for maintaining a single lookup table entry for a bidirectional flow.

FIG. 4 is a flowchart of an example method 400 for maintaining a single lookup table entry for a bidirectional flow, for example by employing a pipeline with recipes in a network entity 111, such as pipeline 200, recipes 300, and network entity 111, respectively. Method 400 may initiate when a packet of a bidirectional flow between communication entities, such as entities 101 and 103, is received at a communications port, a communications queue, or other input/output device coupled to a communications pipeline at block 401. The packet header of the packet may then be received by the pipeline. At block 403, a recipe for network switching is selected for application to the packet. For example, the recipe may be selected by a profile chooser, such as profile chooser 220. The recipe is selected from a plurality of recipes stored in recipe memory, such as recipe memory 240. The plurality of recipes in the memory include direction specific recipes corresponding to the bidirectional flow, and the profile chooser selects the recipe based on both packet flow and packet direction.

At block 405, address information is obtained from the packet header based on the selected recipe. For example, the recipe may contain offsets and/or bit masks to allow the address information to be located in the packet header and/or allow the packet header to be reorganized into a non-direction specific format matching the entries on a lookup table. The address information may be obtained by the profile chooser. The profile chooser may then generate a lookup key based on the address information and the selected recipe at block 407. At block 409, the lookup key is employed to obtain switching information for the packet from a lookup table. As noted above, the lookup table may store a single entry of switching information for the bidirectional flow. Hence the lookup key may contain both the address information and the recipe index to ensure a correct match for the desired flow entry.

At block 411, one or more actions are obtained for the packet from an action table, such as action table 260, as addressed by action pointers in the LUT entry as indicated by the selected recipe. For example, the recipe may include a pointer and/or a bitmap that addresses action pointer(s) in the LUT that contain the location of the actions in the action table. Once the actions are obtained from the action table, the packet is switched by executing such actions at block 413. The actions may be executed by an output processing system, such as output processing system 270, the implementation of which may vary depending on the embodiment of communications pipeline employed and/or the function of the corresponding network entity in the network.

Figure 5:
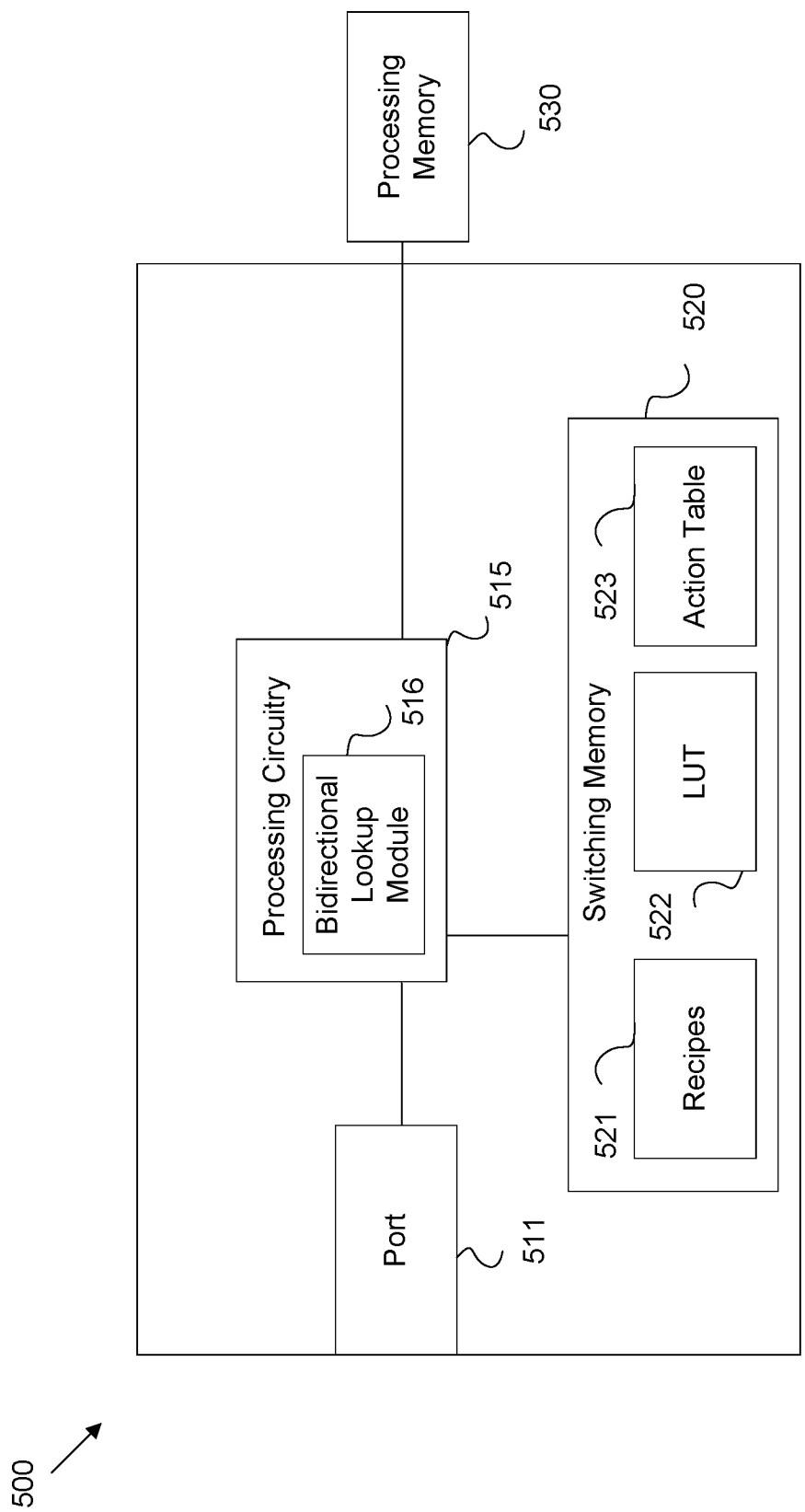
FIG. 5 is a schematic diagram of an example network entity for maintaining a single lookup table entry for a bidirectional flow.

FIG. 5 is a schematic diagram of an example network entity 500 for maintaining a single lookup table entry for a bidirectional flow. For example, network entity 500 may implement a network entity 111 in a network 100 by employing a communications pipeline 200 and recipes 300 to execute method 400. As a specific example, network entity 500 may be employed to implement a network interface card. In other examples, the network entity 500 may be employed to implement a network switch.

Network entity 500 includes communication ports 511 which may be any electrical and/or optical ports, etc. configured to receive packets from a bidirectional flow. For example, ports 511 may include a port for communicating a bidirectional flow between a local communication entity (e.g. on server) and a remote communication entity (e.g. across a network) via a communication link (e.g. cable) by receiving a packet including a packet header. Communication ports 511 may include receivers, transmitters, and/or transceivers. Communication ports 511 are coupled to processing circuitry 515, which may be implemented as a general purpose processor or other computing circuitry, such as an ASIC, a digital signal processor (DSP), a field programmable gate array (FPGA), etc. Processing circuitry 515 is configured to execute instructions from memory 520 and may perform any methods and/or associated steps indicated by the instructions. Processing circuitry 515 may include a bidirectional lookup module 516, which may implement processing portions of a communications pipeline 200. Accordingly, bidirectional lookup module 516 may receive a packet/packet header as part of a bidirectional flow, select a recipe according to packet direction, retrieve the selected recipe, obtain address information from the packet header based on the recipe, generate a lookup key based on the address information and a recipe index, obtain switching information and actions, and perform the actions on the packet. As such, bidirectional lookup module 516 may perform method 400 and/or any other method disclosed herein. In some embodiments, bidirectional lookup module 516 may be implemented in whole or in part in memory 520 as well. Memory 520 may be implemented on the same die as processing circuitry 515, as a processor cache, as random access memory (RAM), as read only memory (ROM), as solid state memory, on hard disk drive(s), or any other memory type. Memory 520 may act as a non-transitory medium for storing data, computer program products, and other instructions, and providing such data/products/instruction to the processor 515 for computation as desired. Memory 520 may also include recipes 521, a LUT 522, and an action table 523, which may implement recipe memory 240, LUT 250, and action table 260, respectively.

In some examples, network entity 500 may be coupled to a processing memory 530, which can be accessed by processing circuitry 515 via DMA and/or a communications queue. Processing memory 530 may be accessible to a local network entity, and hence the processing circuitry 515 may write to processing memory 530 to communicate a received packet to the local entity. The processing circuitry 515 may also read from processing memory 530 to obtain a packet for transmission from the local network entity to a remote network entity via port 511 as part of the bidirectional flow.

It should be noted that processing memory 530 may reside on network entity 500 in some embodiments. Further, port 511 may be removed in favor of processing memory, for example when communicating between two local entities. In some examples, the processing memory 530 may be omitted in favor of additional ports, for example when network entity 500 is a network switch (e.g. not contained in a server) in a network between two entities. It should be noted that the above description is applicable to multiple permutations, and all such permutations are included in the present disclosure.

Aspects disclosed herein may operate on a particularly created hardware, on firmware, digital signal processors, or on a specially programmed general purpose computer including a processor operating according to programmed instructions. The term processor as used herein is intended to include microprocessors, microcomputers, application specific integrated circuits (s), and dedicated hardware controllers. One or more aspects of the present specification may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, random access memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like. Particular data structures may be used to more effectively implement one or more embodiments of the present specification, and such data structures are contemplated within the scope of computer executable instructions and computer-usable data described herein.

EXAMPLES

Illustrative examples of the technologies disclosed herein are provided below. An embodiment of the technologies may include any one or more, and any combination of, the examples described below.

Example 1 includes an apparatus for maintaining a single lookup table entry for a bi-directional flow, the apparatus comprising: a recipe memory to store a plurality of recipes for network switching; a field chooser to: receive a packet header from a packet in a bi-directional flow, select address information from the packet header based on a selected recipe, and generate a lookup key based on the address information and the selected recipe; a lookup table including rows on entries including a single entry of switching information for the bi-directional flow, the lookup table to return the switching information based on the lookup key; and an action table containing rows containing one or more actions for the packet, the actions for the packet returned based on the selected recipe.

Example 2 includes the apparatus of Example 1, wherein the plurality of recipes includes direction specific recipes corresponding to the bi-directional flow.

Example 3 includes the apparatus of Examples 1-2, wherein the selected recipe includes an offset indicating a starting location of the address information in the packet header based on a direction of the packet.

Example 4 includes the apparatus of Examples 1-3, wherein the selected recipe includes a bit mask indicating a bit location of the address information in the packet header based on a direction of the packet.

Example 5 includes the apparatus of Examples 1-2, wherein the selected recipe includes instructions for packet header reorganization based on a direction of the packet, and the field chooser selects address information by reorganizing the packet header based on the instructions of the selected recipe.

Example 6 includes the apparatus of Examples 1-5, wherein the selected recipe includes an indication of an action pointer in the switching information that addresses a location of the one or more actions in the action table based on a direction of the packet.

Example 7 includes the apparatus of Example 6, wherein the indication of the action pointer is a bitmap that indicates a plurality of action pointers that address locations of a plurality of actions in the action table for application to the packet.

Example 8 includes the apparatus of Examples 1-7, further comprising a profile chooser to select the selected recipe based on metadata information in the packet header.

Example 9 includes the apparatus of Examples 1-8, wherein the selected recipe includes an index corresponding to the bi-directional flow, and the lookup key includes the selected recipe index to prevent false positive matches in the lookup table.

Example 10 includes the apparatus of Examples 1-10, wherein the one or more actions for the packet indicate handling instructions for application to the packet based on a direction of the packet.

Example 11 includes a method for maintaining a single lookup table entry for a bi-directional flow, the method comprising: receiving, at a port, a packet as part of a bi-directional flow between communication entities, the packet including a packet header; selecting a recipe for network switching for application to the packet based on a direction of the packet; obtaining address information from the packet header based on the selected recipe; generating, by a field chooser, a lookup key based on the address information and the selected recipe; employing the lookup key to obtain switching information for the packet from a lookup table, the lookup table storing a single entry of switching information for the bi-directional flow; obtaining one or more actions for the packet from an action table based on the selected recipe; and switching the packet by executing the actions obtained from the action table.

Example 12 includes the method of Example 11, wherein the recipe is selected from a plurality of recipes stored in recipe memory, the plurality of recipes including direction specific recipes corresponding to the bi-directional flow.

Example 13 includes the method of Examples 11-12, wherein the recipe includes an offset indicating a starting location of the address information in the packet header based on a direction of the packet.

Example 14 includes the method of Examples 11-13, wherein the recipe includes a bit mask indicating a bit location of the address information in the packet header based on a direction of the packet.

Example 15 includes the method of Examples 11-12, wherein the recipe includes instructions for packet header reorganization based on a direction of the packet, and the field chooser selects address information by reorganizing the packet header based on the instructions of the selected recipe.

Example 16 includes the method of Examples 11-15, wherein the recipe includes an indication of an action pointer in the switching information that addresses a location of the one or more actions in the action table based on a direction of the packet.

Example 17 includes the method of Example 16, wherein the indication of the action pointer is a bitmap that indicates a plurality of action pointers that address locations of a plurality of actions in the action table for application to the packet.

Example 18 includes the method of Examples 11-17, further comprising employing a profile chooser to select the selected recipe based on metadata information in the packet header.

Example 19 includes the method of Examples 11-18, wherein the selected recipe includes an index corresponding to the bi-directional flow, and the lookup key includes the recipe index to prevent false positive matches in the lookup table.

Example 20 includes a network interface card for maintaining a single lookup table entry for a bi-directional flow, the network interface card comprising: a port to communicate a bi-directional flow between a local communication entity and a remote communication entity via a communication link by receiving a packet including a packet header; a communication pipeline coupled to the port, the communication pipeline including: a recipe memory including a plurality of entries to store a plurality of recipes for network switching, a field chooser to: select address information from the packet header based on a selected recipe, and generate a lookup key based on the address information and the selected recipe, a lookup table including a plurality of entries to store switching information, the entries including a single entry of switching information for the bi-directional flow, the lookup table to returning the switching information based on the lookup key, and an action table containing rows containing one or more actions for the packet, the actions for the packet returned based on the selected recipe; and an output processing unit coupled to the communication pipeline to switch the packet by executing the actions obtained from the action table.

Example 21 includes the network interface card of Example 20, wherein the output processing unit is a communications queue.

Example 22 includes the network interface card of Example 21, wherein the output processing unit is a direct memory access unit.

Example 23 includes the network interface card of Examples 20-22, wherein the selected recipe is selected from the plurality of recipes stored in recipe memory, the plurality of recipes including direction specific recipes corresponding to the bi-directional flow.

Example 24 includes the network interface card of Examples 20-23, wherein the selected recipe includes an offset indicating a starting location of the address information in the packet header based on a direction of the packet.

Example 25 includes the network interface card of Examples 20-24, wherein the selected recipe includes a bit mask indicating a bit location of the address information in the packet header based on a direction of the packet.

Example 26 includes the network interface card of Examples 20-23, wherein the selected recipe includes instructions for packet header reorganization based on a direction of the packet, and the field chooser selects address information by reorganizing the packet header based on the instructions of the selected recipe.

Example 27 includes the network interface card of Examples 20-26, wherein the selected recipe includes an indication of an action pointer in the switching information that addresses a location of the one or more actions in the action table based on a direction of the packet.

Example 28 includes the network interface card of Example 27, wherein the indication of the action pointer is a bitmap that indicates a plurality of action pointers that address locations of a plurality of actions in the action table for application to the packet.

Example 29 includes the network interface card of Examples 20-28, further comprising a profile chooser to select the selected recipe based on metadata information in the packet header.

Example 30 includes the network interface card of Examples 20-29, wherein the selected recipe includes an index corresponding to the bi-directional flow, and the lookup key includes the recipe index to prevent false positive matches in the lookup table.

Example 30 includes a non-transitory computer readable medium configured to store a computer program product comprising instructions that, when executed by a processor of a networking entity, cause the networking entity to perform the methods of Examples 11-19.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments of the present disclosure have been illustrated and described for purposes of illustration, it will be understood that various modifications may be made without departing from the spirit and scope of the present disclosure. Accordingly, the embodiments of the present specification should not be limited except as by the appended claims.

We claim:

1. An apparatus comprising:
    a switch comprising:
    an interface and circuitry, coupled to the interface, wherein the circuitry is to:
        process a packet header from a packet in a bi-directional flow, wherein the bi-directional flow comprises communications traversing a same network path in opposite directions,
        access a single entry based on a first data, address information in the packet header, and a direction of the packet within the bi-directional flow, wherein:

the single entry is to specify an action for the packet to indicate handling instructions,
the action for the packet is based on a direction of the packet within the bi-directional flow,
the first data includes the pointer that addresses the location of the action in the action table based on the direction of the packet,
the first data includes an index corresponding to the bi-directional flow,
a location of the action in an action table is based on a direction of the packet and the location is associated with a pointer that identifies the action and at least one of other action to perform on the packet, and
cause performance of the specified action, wherein the specified action comprises one or more of:
security processing of the packet,
routing of the packet,
write contents of the packet to memory for use by a virtual entity,
packet drop based on packet drop criteria being met by the packet header,
network tag modification based on network tag modification criteria being met by the packet header, or
determine network forwarding next hop based on network forwarding criteria being met by the packet header.

2. The apparatus of claim 1, wherein the first data includes an offset indicating a starting location of the address information in the packet header based on a direction of the packet.

3. The apparatus of claim 1, wherein the first data includes a bit mask indicating a bit location of the address information in the packet header based on a direction of the packet.

4. The apparatus of claim 1, wherein the first data includes instructions for packet header reorganization based on a direction of the packet, and the circuitry is to select the address information by reorganizing the packet header based on the instructions of the first data.

5. The apparatus of claim 1, wherein the pointer comprises second data that indicates a plurality of action pointers that address locations of a plurality of actions in the action table for application to the packet.

6. The apparatus of claim 1, further comprising circuitry to select the first data based on metadata information in the packet header.

7. A method comprising:
a switch performing:
receiving a packet as part of a bidirectional flow between communication entities, wherein the packet includes a packet header and the bidirectional flow comprises communications traversing a same network path in opposite directions;
generating a lookup key based on address information and a first data;
obtaining action information for the packet from a lookup table based on the lookup key, the lookup table storing a single entry of the action information for the bidirectional flow;
obtaining one or more actions to perform on the packet from an action table based on the first data, wherein:
the obtained one or more actions are based on a direction of the packet within the bidirectional flow,
a location of at least one of the one or more actions in the action table is based on a direction of the packet and the location is associated with a pointer,
the first data includes the pointer that addresses the location based on the direction of the packet and the first data includes an index corresponding to the bi-directional flow, and
the one or more actions comprise one or more of:
security processing of the packet,
routing the packet,
writing contents of the packet to memory for use by a virtual entity,
packet drop based on packet drop criteria being met by the packet header,
network tag modification based on network tag modification criteria being met by the packet header, or
determine network forwarding next hop based on network forwarding criteria being met by the packet header; and
executing an action of the one or more actions on the packet.

8. The method of claim 7, comprising:
selecting the first data for the packet based on a direction of the packet within the bidirectional flow, wherein the first data is selected from a plurality of first data stored in memory, the plurality of first data including direction specific recipes corresponding to the bidirectional flow.

9. The method of claim 8, wherein the first data includes an offset indicating a starting location of the address information in the packet header based on the direction of the packet.

10. The method of claim 8, wherein the first data includes second data indicating a bit location of the address information in the packet header based on a direction of the packet.

11. The method of claim 8, wherein the first data includes instructions for packet header reorganization based on the direction of the packet, and comprising selecting the address information by reorganizing the packet header based on the instructions of the selected first data.

12. The method of claim 8, wherein the pointer comprises second data that indicates a plurality of action pointers that address locations of a plurality of actions in the action table for application to the packet.

13. The method of claim 8, wherein the selected first data includes an index corresponding to the bidirectional flow.

14. A network interface device comprising:
a switch comprising:
a port to communicate a bi-directional flow between a local communication entity and a remote communication entity via a communication link by receiving a packet including a packet header and
circuitry to:
process the packet header from the packet in a bi-directional flow, wherein the bi-directional flow comprises communications traversing a same network path in opposite directions,
access a single entry based on a first data, address information and a direction of the packet within the bi-directional flow, wherein the single entry is to specify an action for the packet to indicate handling instructions, wherein the first data includes a pointer that identifies a location of the action in an action table based on the direction of the packet and the first data includes an index corresponding to the bi-directional flow, wherein the location of the action in the action table is based on the direction of the packet, and wherein the pointer identifies the action and at least one of other action to perform on the packet, wherein the action for the packet is based on a direction of the packet within the bi-directional flow, and second circuitry to perform the action, wherein the action comprises one or more of:
  security processing to the packet,
  routing the packet,
  writing contents of the packet to memory for use by a virtual entity,
  packet drop based on packet drop criteria being met by the packet header,
  network tag modification based on network tag modification criteria being met by the packet header, or
  determine network forwarding next hop based on network forwarding criteria being met by the packet header.

15. The network interface device of claim 14, wherein the second circuitry comprises a communications queue.

* * * * *